United States Patent
Wang et al.

(10) Patent No.: US 9,256,268 B2
(45) Date of Patent: Feb. 9, 2016

(54) ADAPTIVE LOW-POWER LINK-STATE ENTRY POLICY FOR ACTIVE INTERCONNECT LINK POWER MANAGEMENT

(75) Inventors: Ren Wang, Portland, OR (US); Ahmad Samih, Beaverton, OR (US); Christian Maciocco, Portland, OR (US); Tsung-Yuan Charlie Tai, Portland, OR (US); James Jimbo Alexander, Hillsboro, OR (US); Prashant R. Chandra, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 261 days.

(21) Appl. No.: 13/994,786

(22) PCT Filed: Apr. 24, 2012

(86) PCT No.: PCT/US2012/034761
§ 371 (c)(1),
(2), (4) Date: Jun. 17, 2013

(87) PCT Pub. No.: WO2013/162512
PCT Pub. Date: Oct. 31, 2013

(65) Prior Publication Data
US 2014/0195833 A1     Jul. 10, 2014

(51) Int. Cl.
*G06F 1/32* (2006.01)
(52) U.S. Cl.
CPC ............ *G06F 1/3203* (2013.01); *G06F 1/3253* (2013.01); *Y02B 60/1235* (2013.01); *Y02B 60/32* (2013.01)

(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10
USPC ......................................... 713/300, 310, 320
See application file for complete search history.

(56) References Cited

U.S. PATENT DOCUMENTS

| | | | |
|---|---|---|---|
| 7,137,018 B2 * | 11/2006 | Gutman et al. | 713/323 |
| 2007/0008887 A1 * | 1/2007 | Gorbatov et al. | 370/230 |

(Continued)

FOREIGN PATENT DOCUMENTS

WO     2013/162512 A1     10/2013

OTHER PUBLICATIONS

Mahesh Wagh, PCI Express* 3.0 Technology: Device Architecture Optimizations on Intel Platforms, Jul. 27, 2009.*

(Continued)

*Primary Examiner* — Zahid Choudhury
(74) *Attorney, Agent, or Firm* — Law Office of R. Alan Burnett, PS

(57) ABSTRACT

Methods and apparatus for implementing active interconnect link power management using an adaptive low-power link-state entry policy. The power state of an interconnect link or fabric is changed in response to applicable conditions determined by low-power link-state entry policy logic in view of runtime traffic on the interconnect link or fabric. The low-power link-state policy logic may be configured to include consideration of operating system input and Quality of Service (QoS) requirements for applications and devices employing the link or fabric, and device latency tolerance requirements.

14 Claims, 6 Drawing Sheets

(56) References Cited

U.S. PATENT DOCUMENTS

| | | | |
|---|---|---|---|
| 2007/0050653 A1 | 3/2007 | Verdun | |
| 2007/0067548 A1 | 3/2007 | Juenger | |
| 2008/0080380 A1 | 4/2008 | Lee et al. | |
| 2008/0288798 A1* | 11/2008 | Cooper et al. | 713/322 |
| 2008/0294820 A1* | 11/2008 | Croxford | 710/105 |
| 2009/0125735 A1* | 5/2009 | Zimmerman | 713/310 |
| 2009/0158069 A1* | 6/2009 | Oh | 713/323 |
| 2009/0327774 A1* | 12/2009 | Jeyaseelan et al. | 713/320 |
| 2011/0103246 A1* | 5/2011 | Byun | 370/252 |
| 2013/0003559 A1* | 1/2013 | Matthews | 370/241 |
| 2013/0042126 A1* | 2/2013 | Ganesan et al. | 713/322 |

OTHER PUBLICATIONS

PCI Express, "PCI Express Base Specification Revision 3.0", Nov. 10, 2010, 860 pages.

International Preliminary Report on Patentability and Written Opinion received for PCT Patent Application No. PCT/US2012/034761, mailed on Nov. 6, 2014, 6 pages.

International Search Report and Written Opinion received for PCT Application No. PCT/US2012/034761, mailed on Dec. 12, 2012, 10 pages.

* cited by examiner

ADAPTIVE LOW-POWER LINK-STATE ENTRY POLICY FOR ACTIVE INTERCONNECT LINK POWER MANAGEMENT

TECHNICAL FIELD

The field of invention relates generally to power management in computer systems and, more specifically but not exclusively relates to techniques for putting interconnect links and fabrics into reduced power states using an adaptive low-power link-state entry policy.

BACKGROUND ART

Ever since the introduction of the microprocessor, computer systems have been getting faster and faster. In approximate accordance with Moore's law (based on Intel® Corporation co-founder Gordon Moore's 1965 publication predicting the number of transistors on integrated circuits to double every two years), the speed increase has shot upward at a fairly even rate for nearly three decades. At the same time, the size of both memory and non-volatile storage has also steadily increased, such that many of today's personal computers are more powerful than supercomputers from just 10-15 years ago. In addition, the speed of network communications has likewise seen astronomical increases.

Ever increasing speeds have produced more powerful processors and devices employing the processors (such as PCs, servers, workstations, and mobile devices). More powerful in more ways than just processing power—these processors and devices also consume more power. Higher power consumption is undesirable on several fronts. First, it leads to increased die temperatures, reducing processor life. For line-powered computers, such as PC's and servers, increased power results in higher energy bills. In high-density server deployments such as server farms and data centers, small increases in power on a per server basis result in huge increases in power consumption and resulting costs for the deployment (and conversely, small power reduction on a per server basis result in significant cost savings). Power consumption is a huge factor in mobile device performance. For example, an engineer could design a mobile device with processing power equal to a high-end server; however, such a device would have such a short battery life that it would be unacceptable for commercial uses.

There are various techniques for reducing power in computers and other processor-based devices. A common technique is to put the processor into a reduced power state (aka idle states or sleep states) when it isn't being actively used. Recently introduced multi-core processors support the ability to put processor cores into selected idle states on an individual core basis. There are even power control techniques that apply to a processor as a whole. For example, microprocessor performance states (P-States) are a pre-defined set of frequency and voltage combinations at which the microprocessor can operate when the CPU is active. The microprocessor utilizes dynamic frequency scaling (DFS) and dynamic voltage scaling (DVS) to implement the various P-States supported by a microprocessor. DFS and DVS are techniques that dynamically changes the operating frequency and operating voltage of the microprocessor core based on current operating conditions. Thus, power savings can be effected across a processor by changing its P-State. Package power states (e.g., Pck C-States) may also be applied the processor level to significantly reduce power. Power saving techniques can also be applied at the overall platform level, resulting in further savings.

Most of these approaches target power savings at a particular component or set of components (e.g., cores or the uncore). However, there is still a significant portion (~10% to 30%) of the platform power consumed by various interconnect fabric and links, both within the processor die and between the processor and other platform components. Interconnect fabric consists of routers, ports and links, with the ports and associated links consuming non-negligible amount of power (~70% of the router power). In order to reduce the holistic platform power consumption multiple link low power states are defined and implemented to achieve link power saving.

In the PCIe Specification, various power saving states are provided for a link (i.e., an interface) of a serial interconnect. Specifically, the specification describes the presence of link states L0, $L0_s$, L1, L2 and L3. The L0 state corresponds to link on and the L2 and L3 states correspond to link off (with the difference being that auxiliary power is present in the L2 state), while the $L0_s$ state provides for a low-resume standby latency state, and the L1 state corresponds to a low power standby state. These low power states may be achieved via the Active Status Power Management (ASPM) capability of a PCIe interface, which enables an endpoint device to request entry into a low power state. In general, as the link power state is lowered, additional power savings is realized; however, the lower the power state, the larger the exit (link resume) latency to return the link back to an active state. Similar power states are also defined for other fabrics and interconnects such as IOSF (Intel on-chip System Fabric) and Thunderbolt®.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DESCRIPTION OF THE EMBODIMENTS

Embodiments of methods and apparatus for implementing active interconnect link power management using an adaptive low-power link-state entry policy are described herein. In the following description, numerous specific details are set forth (such as exemplary uses of PCIe) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Aspects of the embodiments described herein may be employed for facilitating active interconnect link power management using adaptive low-power link-state entry policies For exemplary and non-limiting purposes, some embodiments are presented in a use context employing PCIe interconnects and associated protocols. Accordingly, the following overview of PCIe is provided for a better understanding of how techniques associated with the embodiments may be implemented.

PCIe was designed to replace older PCI and PCI-X standards, while providing legacy support. PCIe employs point-to-point serial links rather than the shared parallel bus architecture employed by PCI (32-bit) and PCI-X (64-bit). Each link supports a point-to-point communication channel between two PCIe ports using one or more lanes, with each lane comprising a bi-directional serial link. The lanes are physically routed using a crossbar switch architecture, which supports communication between multiple devices at the same time. As a result of its inherent advantages, PCIe has replaced PCI as the most prevalent interconnect in today's desktop, server, and mobile computing platforms. PCIe is an industry standard managed by the PCI-SIG (Special Interest Group). As such, PCIe pads are available from many ASIC and silicon vendors.

Figure 1:
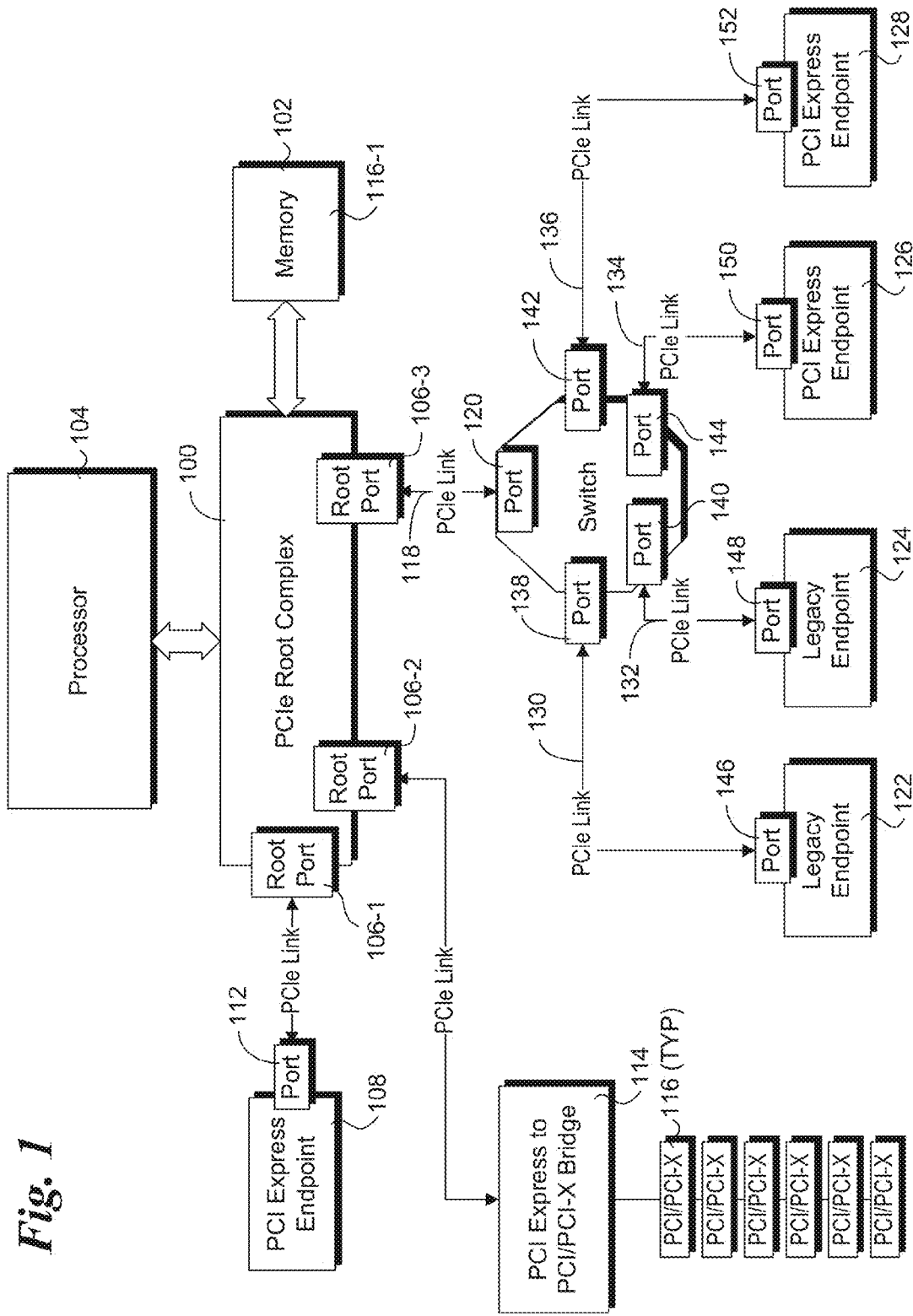
FIG. 1 is a diagram of a generic PCIe architecture.

A generic platform architecture illustrating some basic PCIe components is shown in FIG. 1. At the heart of the architecture in a PCIe Root Complex (RC) 100 coupled to a processor 102 and memory 104. The PCIe RC 100 is depicted as including three Root Ports 106-1, 106-2, and 106-3. Root Port 106-1 is connected to a PCI Express endpoint 108 via a PCIe link 110 and a PCIe port 112. Root Port 106-2 is connected to a PCI Express to PCI/PCI-X bridge 114, which is used as an interface between PCIe and a plurality of PCI/PCI-X devices 116. Root Port 106-3 is connected to a switch 116 via a PCIe link 118 and a PCIe port 120. Switch 116 is depicted as connected to a pair of legacy endpoints 122 and 124, and a pair of PCI Express endpoints 126 and 128. This connections are facilitated by PCIe links 130, 132, 134 and 136, and ports 138, 140, 142, 144, 146, 148, 150, and 152.

A Root Complex denotes the root of an I/O hierarchy that connects the CPU/memory subsystem to the I/O. As illustrated in FIG. 1, a Root Complex may support one or more PCI Express Ports. Each interface defines a separate hierarchy domain. Each hierarchy domain may be composed of a single Endpoint or a sub-hierarchy containing one or more Switch components and Endpoints. A Root Complex may optionally support routing of peer-to-peer transactions between hierarchy domains.

Endpoint refers to a type of Function that can be the Requester or Completer of a PCI Express transaction either on its own behalf or on behalf of a distinct non-PCI Express device (other than a PCI device or Host CPU), e.g., a PCI Express attached graphics controller or a PCI Express-USB host controller. Endpoints are classified as either legacy, PCI Express, or Root Complex Integrated Endpoints.

PCIe supports a point-to-point interconnect using serial links made up of one or more lanes for each of transmission and receiving. A PCIe link has at least one lane—each lane represents a set of differential signal pairs (one pair for transmission, one pair for reception). To scale bandwidth, a link may aggregate multiple lanes denoted by xN where N may be any of the supported link widths. For example, as of the PCIe 3.0 specification, PCIe links include operations for x1, x2, x4, x8, x12, x16, and x32 lane widths. During hardware initialization, each PCI Express link is set up following a negotiation of lane widths and frequency of operation by the two agents at each end of the link.

Figure 2:
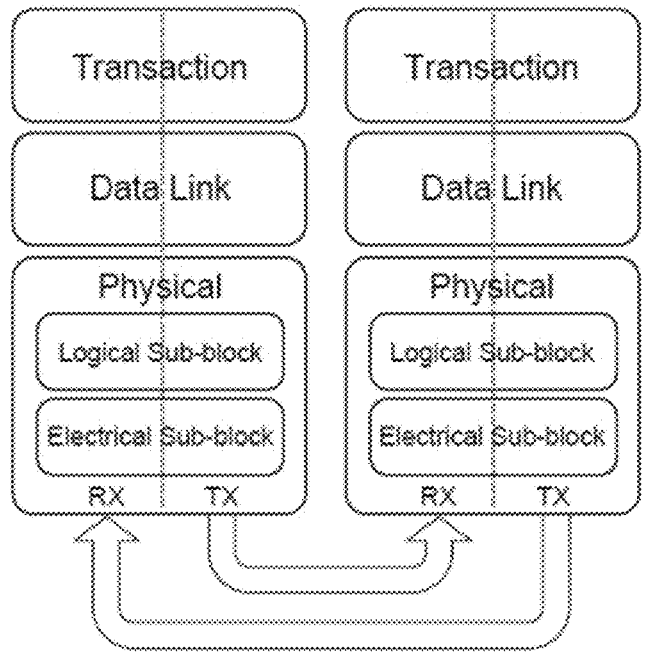
FIG. 2 shows the layers of the PCIe protocol stack.
Figure 3:
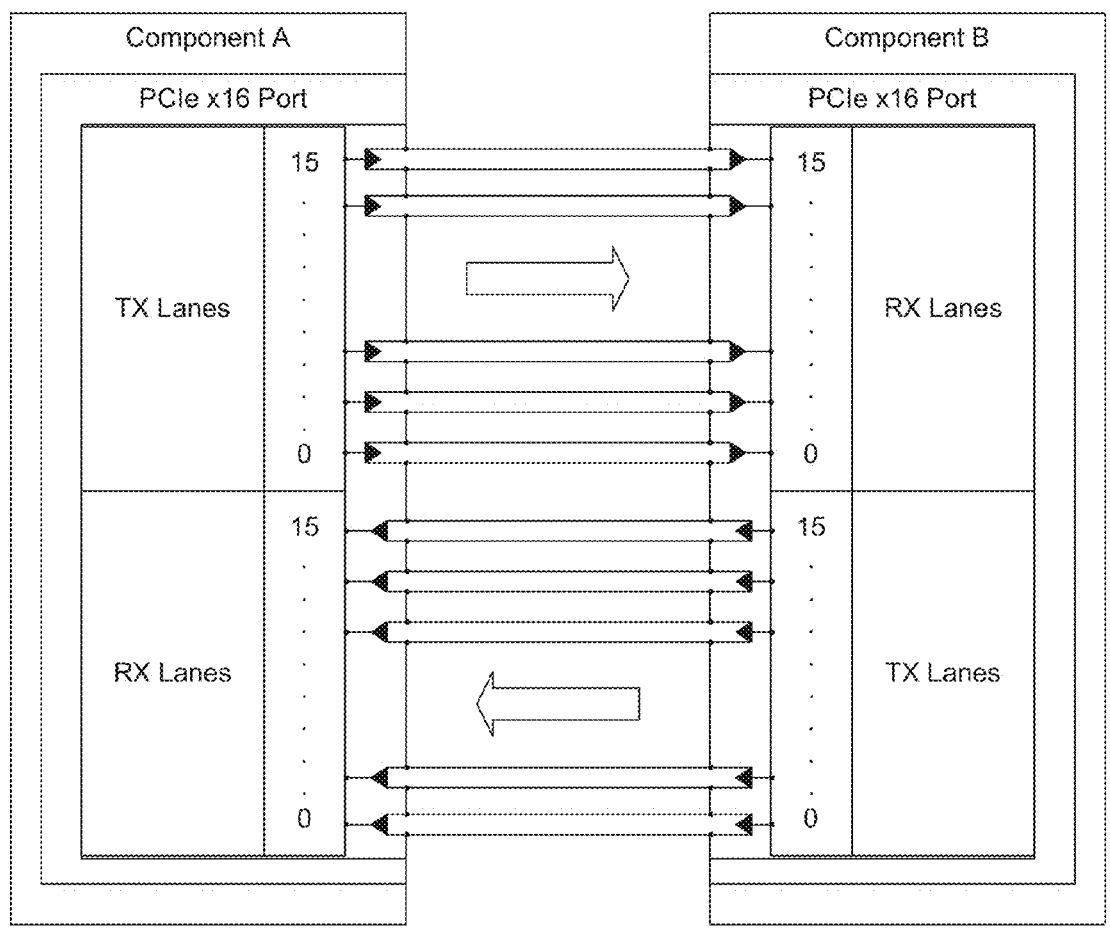
FIG. 3 is a schematic diagram illustrating the structure of a PCIe x16 link.

As shown in FIG. 2, PCI Express uses a layered protocol, including a Physical Layer, Data Link Layer and Transaction Layer. The Physical Layer further includes a Logical Sub-block and an Electrical Sub-block. PCI Express uses packets to communicate information between components. Packets are formed in the Transaction and Data Link Layers to carry the information from the transmitting component to the receiving component. As the transmitted packets flow through the other layers, they are extended with additional information necessary to handle packets at those layers. At the receiving side the reverse process occurs and packets get transformed from their Physical Layer representation to the Data Link Layer representation and finally (for Transaction Layer Packets) to the form that can be processed by the Transaction Layer of the receiving device. FIG. 3 shows the conceptual flow of transaction level packet information through the layers.

FIG. 3 shows the physical connectivity of a PCIe x16 link. As identified by "x16," this link employs 16 lanes, each comprising a differential signal pair. A PCIe interconnect having circuitry to support an x16 link may also be configured as two x8 links. Additionally, the width of an x16 link may be automatically reduced to an x8 link, or even an x4 link in response to detection of errors. Rather than employ separate clock signals, clock data under PCIe are embedded in the data transmission and recovered via the physical layer at end points in the link.

When the platform is active, links can potentially enter certain low power states. For example, under the ASPM protocol, the link power state can be reduced to L0s and L1 for PCIe, depending on Operating System (OS) configuration. When an OS is set to a "Moderate Power Saving" setting, the links will attempt to use the L0s state when it is idle; while with a "Maximum Power Savings" setting, links will attempt to use the L1 state when it is idle. Currently, the ASPM low power state entrance is initialized, either statically by the devices that controls the link (i.e., when devices enter low power state, they put corresponding links into low power state as well), or by a timeout policy that uses a fixed timeout to detect idleness. Specifically, there is an implementation-specific timeout value, usually a multiplier of link resume latency. When the idle duration reaches the timeout value, the links starts the transition into the low power state.

In current platforms, the fixed link state change timeout values are usually very long as compared to the link resume latency, and they do not adapt to any run time dynamics. When links stay at L0, periodic messages (e.g., link training, credit update, etc.) are exchanged over the links, resulting in a busy link with short idle duration between the transactions even when the data traffic is very light.

Figure 4:
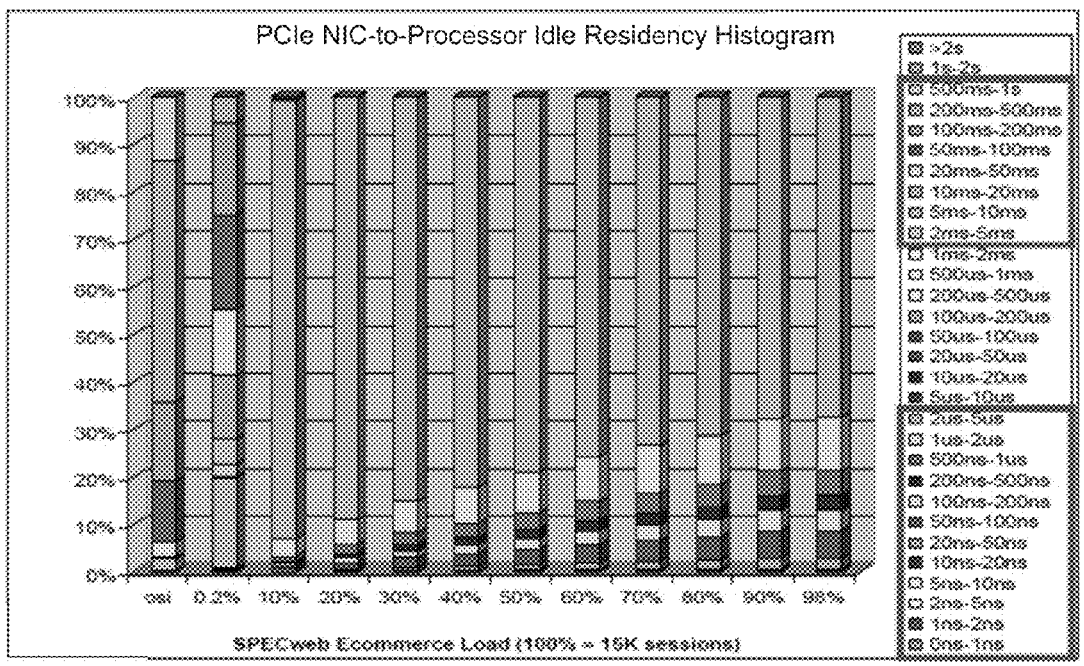
FIG. 4 is a PCIe NIC-to-Processor idle residency histogram derived by simulating a NIC workload as defined by the SPECweb Ecommerce load.

For example, FIG. 4 shows a PCIe NIC-to-Processor idle residency histogram derived by running a benchmark workload as defined by the SPECweb Ecommerce, as averaged over 15,000 sessions. The X axis represents the CPU load, while the Y axis represents the percentage of the idle period for each of the time ranges defined in the legend at the right of the histogram. The most frequency idle period that was observed (by a significant margin) is the 2 μs-5 μs range, and the rest of the idle durations at 10% CPU load and above are <2 μs. These short idle durations, in turn, incur potentially unnecessary power consumption as the link will stay in L0 even at low loads as the link to change state is greater than 5 μs.

Figure 5:
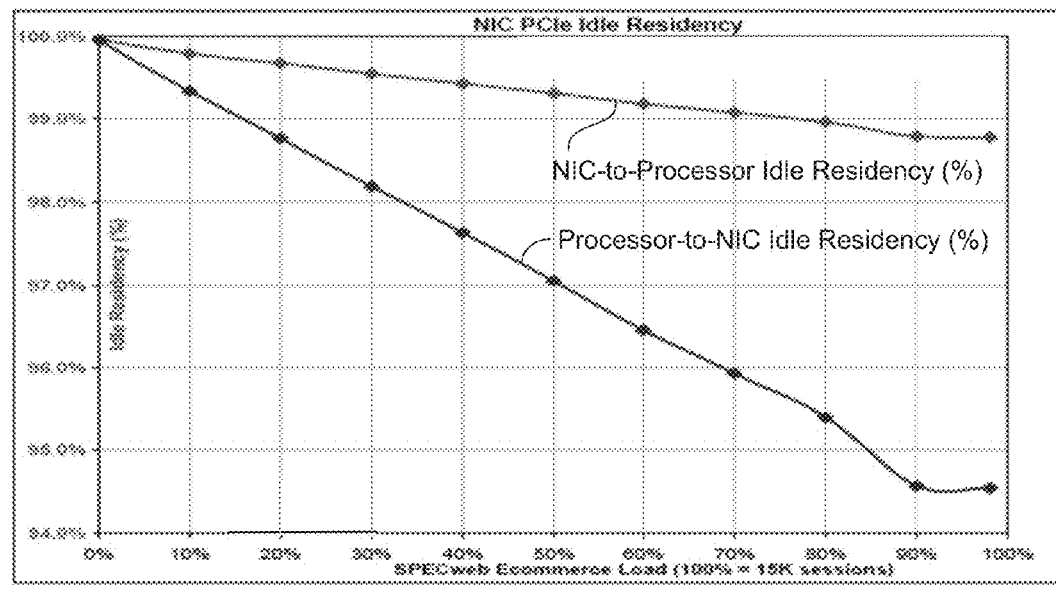
FIG. 5 is a PCIe NIC idle residency histogram derived by simulating a NIC workload as defined by the SPECweb Ecommerce load.

The histogram of FIG. 5 illustrates a similar situation. In this diagram, the Y-axis corresponds to the idle residency percentage (that is, the relative amount of time the link is idle), while the X-axis corresponds to the CPU load, as before. As illustrated, even at a 50% CPU load the downlink on the PCIe link is 96.5% idle and the uplink is 99.5% idle (uplink). When the idleness histograms of FIGS. 4 and 5 are considered in view of current low power state entrance practices, one recognizes that significant potential opportunities for power savings could be achieved if the link state was controlled such that the link state is more closely aligned to the link idleness under real workload conditions.

In accordance with aspects of embodiments herein, the foregoing problem is addressed through employment of a novel adaptive policy for low power state entrance. The adaptive policy is configured to maximize link power saving while maintaining certain QoS (Quality of Service) performance. The general concept of this proposed approach is that the link state change timeout value should be adaptively adjusted at run time, based on the traffic pattern and OS/application/device QoS requirements. When the traffic is light and the QoS requirement is relatively loose, the link state change timeout value is adjusted downward to a smaller value, enabling the link to reach a lower power state to potentially enable aggressive power savings. On the other hand, when the traffic is heavy and/or the QoS requirement is strict, the link state change timeout value should be large to guarantee the fast response of the link by preventing the link into entering a lower power state having a longer exit latency. By adapting the timeout value (and thus the low power state entry policy) based on the traffic condition and QoS requirement, greater power savings can be realized while maintaining the desired performance.

Returning to FIG. 1, each link within a PCIe hierarchy consists of the physical channel and upstream and downstream ports. There are multiple fabric specific requirements to be met in order to determine that a link is "idle", including both upstream port and downstream port activity. For example, considerations at each port might include whether no TLP (Transaction Layer Packet) is pending to transmit; no DLLPs (Data Link Layer Packets) are pending for transmission, etc. The techniques for determining when a link is idle and the corresponding power states of links and fabrics for various types of interconnects and fabrics are well known to those skilled in the art, and accordingly, details of such techniques are not described in detail herein.

Figure 6:
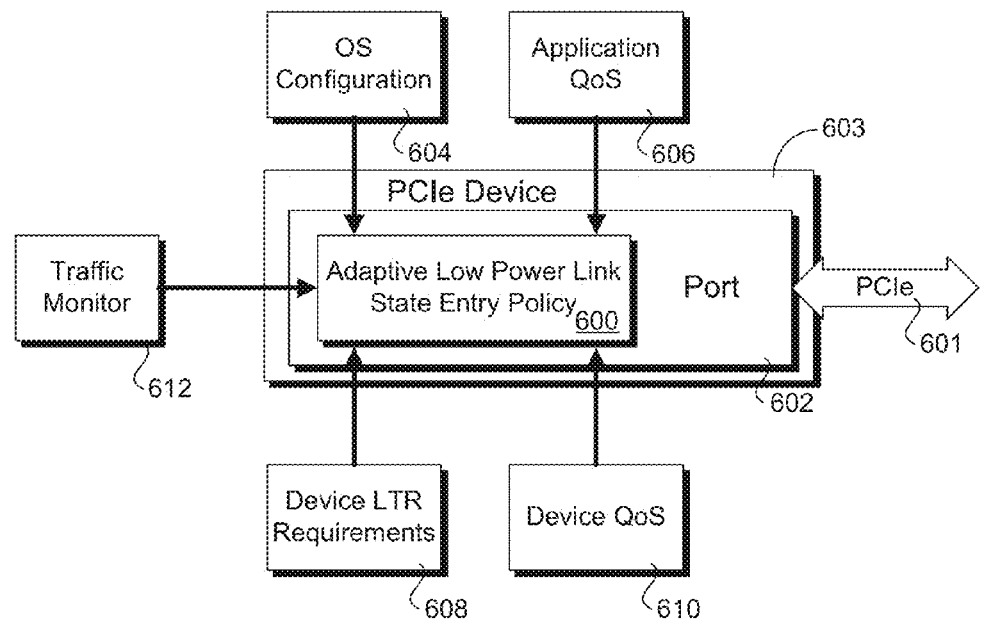
FIG. 6 illustrates a high level architecture of one embodiment of an adaptive ASPM low-power link-state entry policy implementation.

FIG. 6 illustrates the high level architecture of one embodiment of an adaptive low-power link-state entry policy implementation, where multiple inputs are considered to determine which low power link state can be attempted and what link state change timeout value should be employed. As illustrated in FIG. 6, in one embodiment an adaptive low power link state entry policy block 600 for controlling the link state of a PCIe link 601 is implemented in a port 602 of a PCIe device 603. The adaptive low power link state entry policy is configured based on various static and/or runtime configuration and QoS criteria, as depicted by an OS configuration block 604, an application QoS block 606, a Device LTR (Latency Tolerance Report) requirements block 608, and a device QoS block 610. During runtime operations, link traffic is monitored and corresponding traffic data is input to adaptive low power link state entry policy block 600, as depicted by a traffic monitor block 612. Based on the configuration and QoS inputs in conjunction with logic for implementing the adaptive policy, adaptive low power link state entry policy block 600 will respond to dynamic runtime traffic conditions (as well as potential runtime changes to requirements by the OS, application(s) and/or device) to effect low power link state entry for link 601.

In one embodiment, inputs corresponding to OS configuration block 604 and Device LTR requirements block 608 are implementing using existing facilities for providing input to conventional ASPM low power link state entry policy logic. These inputs define the lowest ASPM state that can be attempted to guarantee that the resume latency is smaller than what the OS and the device can tolerate.

However, this conventional approach has limited adaptability and does not adequately respond to real-time link traffic conditions and other considerations. Under the inventive approach disclosed herein, applications can inject their QoS requirement to the fabric, where the requirement translates into different dynamic timeout values, with shorter values corresponding to higher QoS requirements. In addition to device LTR input, devices can opt to provide their QoS requirement as well (as depicted by device QoS block 610); device QoS requirement input operates in a similar manner to application QoS requirement input and adjusts the timeout value in the similar fashion.

Another important function block for the adaptive low power state policy is traffic monitor block 612, which monitors, at run time, the link utilization and traffic pattern for the link. When the traffic is light, the timeout can be adjusted upward to take advantage of the frequent and long idleness. On the other hand, when the traffic is heavy, the timeout value should be small to avoid congestion and delay due to slow link response.

Figure 7:
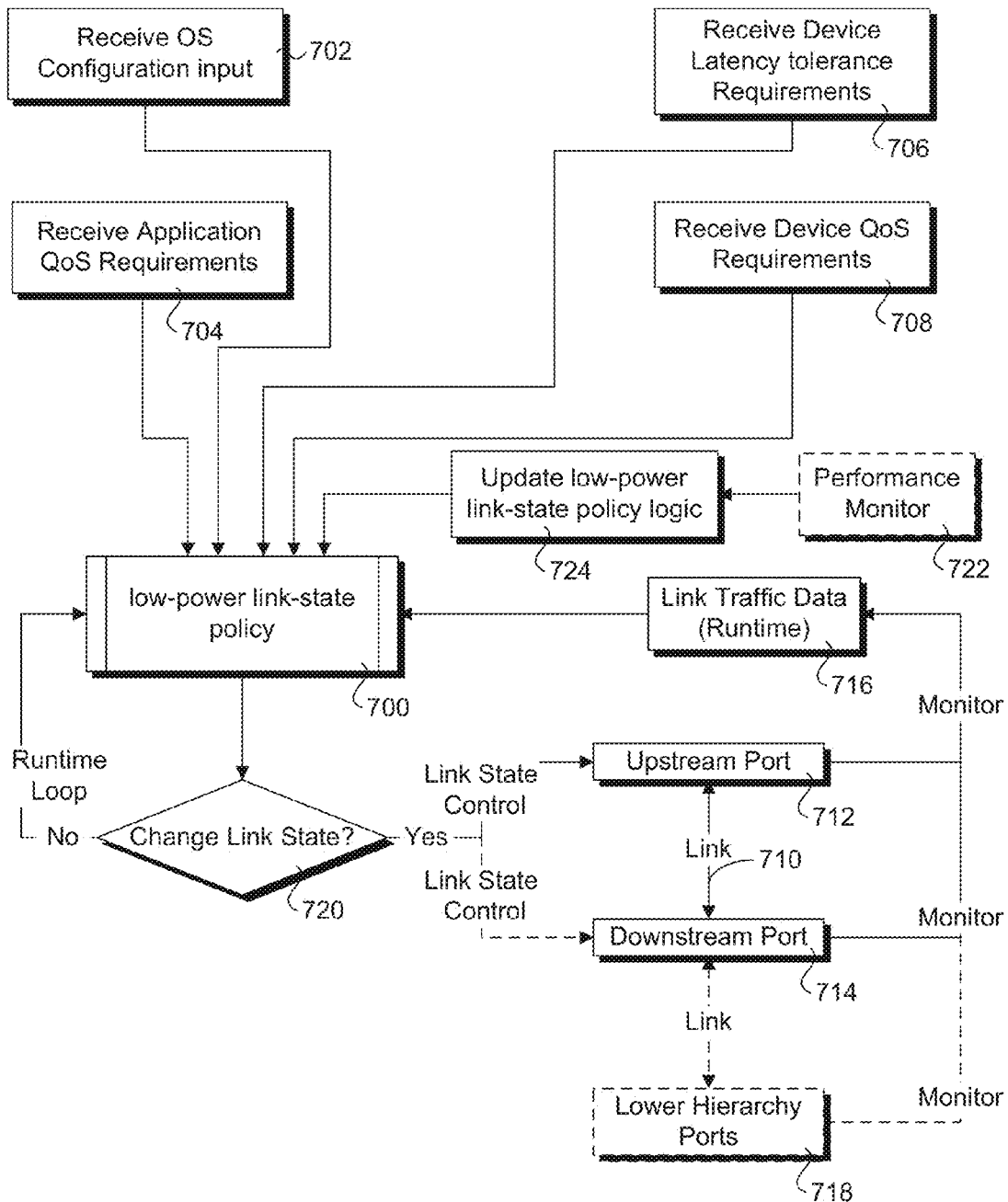
FIG. 7 is a combined flowchart and block diagram illustrating various operations and logic performed during configuration setup and runtime operations for one embodiment of a low-power link-state policy implementation.

FIG. 7 shows a combined flowchart and block diagram illustrating various operations and logic performed during configuration setup and runtime operations for one embodiment of a low-power link-state policy implementation. At the core of the implementation is a low-power link-state policy block 700, which in one embodiment comprises embedded logic configured to implement a low-power link-state policy through use of one or more algorithms employing various parameters associated with inputs received from various sources. As depicted by block 702, 704, 706, and 708, these inputs include OS configuration input, application QoS requirements, device latency tolerance requirements, and device QoS requirements. Generally, these inputs may be received during platform initialization operations and/or during runtime operations. In addition, although depicted as separate inputs, the inputs may be received over one or more interfaces, wherein inputs from multiple of blocks 702, 704, 706, and 708 may be received over the same interface. For example, in one embodiment, the operating system has access to one or more of application QoS requirements, device latency tolerance requirements and device QoS requirements. Accordingly, these requirements are input by the OS in addition to the OS configuration input.

During platform runtime operations, there are two loops that are performed in parallel and interact to effect the low-power link-state policy. As depicted toward the lower right portion of FIG. 7, link traffic corresponding to an interconnect link 710 is monitored at one or both of an upstream port 712 and a downstream port 714 by a link traffic monitor 716. In addition, in one embodiment link ports at one or more lower levels in an interconnect hierarchy that includes link 710, as depicted by a lower hierarchy ports block 718, may also be monitored. For example, downstream port 714 may correspond to an upstream port in a switch; accordingly, the traffic activity monitored at one or more downstream ports in the switch may be relevant to the low-power link-state policy to be implemented for link 710. Link traffic data derived from the traffic monitored by link traffic monitor 716 is then forwarded to low-power link-state policy block 700. For example, link traffic data may be forwarded on a periodic basis, or may be forwarded when an applicable change in the link traffic is detected.

In response to the link traffic data and other runtime inputs (as applicable), the low-power link-state policy may be adjusted to enhance power performance while maintaining applicable QoS and latency requirements. For example, this may be effected by changing parameters in a low-power link-state algorithm that is used to determine when a change in link-state is applicable. The result of this determination, which is performed in an ongoing manner during runtime, is depicted by a decision block 720. When a link-state change is to be implemented (i.e., the result of decision block 720 is Yes), applicable control signals are generated to effect the change in link state.

Depending on the particular interconnect technology, this may be implemented in various manners. For example, in one embodiment a message may be received from or originated at a link-state control entity (such as low-power link-state policy block 700, a device driver, or a Power Control Unit (PCU)) and forwarded to an agent at each of upstream port 712 and downstream port 714 that instructs the interfaces at these ports to reduce the power state of link 710. For example, in one embodiment a management packet targeting a particular end device or link could be propagated to the device or link via one or more interconnect links, wherein agents at applicable link interfaces (corresponding to the targeted device or link) could effect link-state power changes defined by data in the management packet. Alternatively, for interconnect links employing synchronized clocking signals at each port (e.g., QPI), the input clock signal rate could be reduced or the clock signals could be shut off at each of upstream port 712 and downstream port 714 via use of a clock signal distribution scheme or the like. It is noted that other techniques for effecting link-state changes may also be implemented, as will be recognized by those skilled in the art.

In one embodiment performance of the low-power link-state policy implementation is monitored, and the algorithm logic and or parameters may be adjusted in response to applicable monitored performance criteria. These operations are depicted by a performance monitor 722 and an update low-power link-state policy logic block 724 (depicted in dashed lines to indicate these blocks are optional). For example, data related to link 710 such as link idleness data, link power state data, link traffic data, etc., may be collected by performance monitor 722 and processed to determine whether the current algorithm(s) employed by low-power link-state policy block 700 is performing at an adequate level. If not, logic implemented by performance monitor 722 or another entity could be used to adjust the parameters of an algorithm or cause a currently used algorithm to be replaced with another algorithm. For example, low-power link-state policy block 700 may employ multiple algorithms having different levels of power savings aggressiveness, under which one algorithm might be very aggressive (with respect to power savings), while another algorithm may be more conservative. (It is noted that a single algorithm could implement various levels of power savings aggressiveness via changes to parameters used by the algorithm; in this case, the algorithm would not be replaced with another algorithm.)

In general, the various logic and blocks depicted in FIG. 7 may be implemented via hardware, firmware, and/or software. Moreover, hardware implementation of selected blocks may be facilitated using separate functional blocks, may be combined within the same functional block, or may be implemented within an existing functional unit. For example, existing PCIe port architectures are configured for implementing conventional low-power link-state power management logic. Such PCIe port architectures could be augmented to implement aspects of the low-power link-state policy embodiments described herein.

Figure 8:
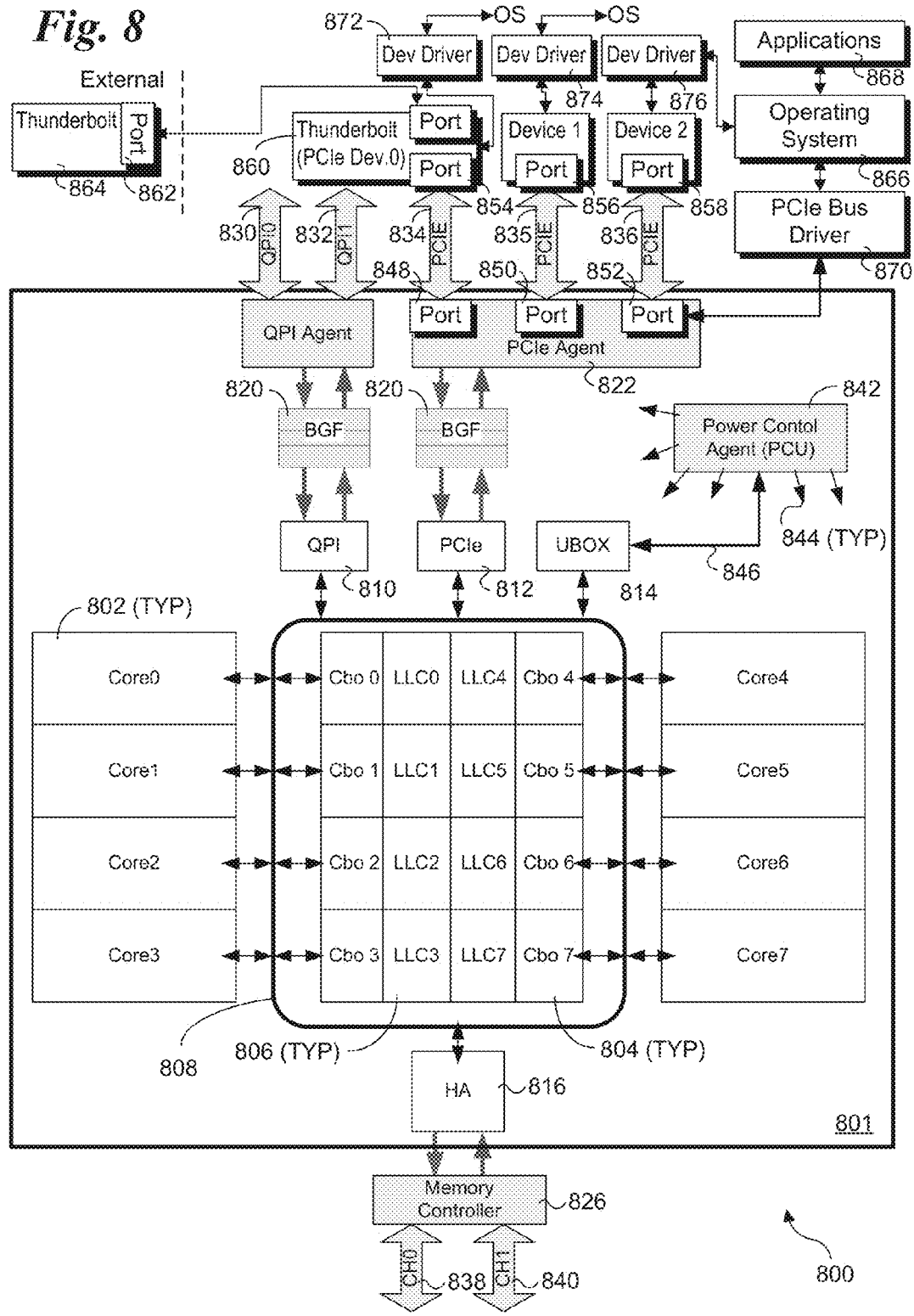
FIG. 8 is a schematic block diagram illustrating selected components of an exemplary processor and platform configuration via which aspects of the embodiments disclosed herein may be implemented.

FIG. 8 shows an exemplary platform architecture 800 that may be used for implementing aspects of the embodiments described herein. The platform architecture is simplified and only depicts selected components for brevity and clarity. Platform architecture 800 depicts an 8-core processor 801 including processor cores 802 (labeled Core0-Core7), which are coupled to respective caching boxes 804 (labeled Cbo 0-7, also referred to as CBOXes) and last level caches (LLCs) 806 (labeled LLC0-LLC7). The processor cores, Cbo's, and LLC's are connected to nodes (not shown) on a ring interconnect 808. Also connected to ring interconnect 808 via corresponding nodes (not shown) are a QPI block 810, a PCIe block 812, a UBOX (Utility Box) 814, and a Home Agent (HA) 816.

QPI block 810 includes a QPI interface that is coupled to a QPI agent 818 via a buffer 820. PCIE block 812 is coupled to a PCIE agent 822 via a buffer 824. Meanwhile, HA 816 is coupled to a memory controller 826. Each of the QPI agent, PCIe agent, and memory controller are depicted as coupled to corresponding communication links, including QPI agent 818 couple to QPI links 830 and 832, PCIe agent 822 coupled to PCIe links 834, 835, and 836, and memory controller 826 coupled to memory channels 838 and 840.

In general, the components of processor architecture 800 are interconnected via various types of interconnects, which are depicted as double-headed arrows for convenience. As discussed above, in one embodiment, processor architecture 800 employs a ring interconnect 808. Optionally, the processor cores and related components and agents may be connected via an interconnect fabric (e.g., a 2D mesh interconnect). The interconnects may comprises point-to-point interconnects (e.g., QPI, PCIe, IOSF, Open Core Protocol (OCP) etc.), as well as buses and other types of interconnect structures.

Processor architecture 800 further includes a Power Control Agent (PCU) 842. PCU is configured to facilitate power control aspects for processor 801, such as putting a processor and/or its components into various reduced power states, and communicating power state information and latency information to other processors over applicable communication links. PCU 842 supports global connections 844 to various components on the platform that may have power-related aspects such as power states controlled by PCU 842. These connections may be facilitated in part or in whole via communication facilities provided by UBOX 814, which is connected to PCU 842 via a message channel 846. UBOX 814 provides global communication connections to various processor components (not shown for clarity), and is configured to forward and receive messages originating from and destined for PCU 842 over message channel 846.

PCIe agent 822 includes a plurality of PCIe interfaces including PCIe ports 848, 850, and 852. In the illustrated example, PCIe links 834, 835, and 836 are respectively connected to PCIe ports 854, 856, and 858 of a Thunderbolt interface 860 (PCIe device 0), a PCIe Device 1, and a PCIe Device 2. The port of Thunderbolt interface 860 is connected to a port 862 of a Thunderbolt interface 864 of a device that is external to the platform. For instance, Thunderbolt links may be used to support communication with various types of devices, such as PCIe devices and display devices, that are external to a computer system. Thus, Thunderbolt extends PCIe to devices external to the platform. Accordingly, aspects of the embodiments herein may be used to support power management of links between computer systems and external devices or between computer systems.

FIG. 8 further illustrates software components including an operating system 866, applications 868, a PCIe bus driver 870, and device drivers 872, 874, and 876. During platform operation, the OS 866 is enabled to communicate with ports 854, 856, and 858 via PCIe bus driver 870, and is enabled to communicate with ports in PCIe devices 0, 1, and 2 via their respective device drivers 872, 874, and 876. This enables the operating system to provide OS configuration information and other data to the adaptive low-power link-state entry policy logic in these ports. In addition, OS 860 can provide application QoS requirements for applications 868. Meanwhile, device QoS requirements and device latency tolerance requirements are provided directly from the PCIe devices to their ports using standard PCIe techniques.

The embodiments herein provide significant advantages over existing art. Compared to the default policies used today, the novel approach of the embodiments herein employ adaptive low-power link-state policies to harvest power saving when possible (e.g., light traffic and/or loose QoS requirements), while maintaining link performance. An addition, the approach may be implemented for various interconnect links or fabrics for which a policy to control low-power link-state entry is applicable, such as, but not limited to PCIe, IOSF, QPI, and Thunderbolt.

In some embodiments, the invention may be used by vendors in a variety of power control contexts. This includes use, for example, by processor vendors, as well as use by other hardware vendors (e.g., graphics hardware manufacturers) and OS vendors (for OS directed power control of devices).

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
   implementing an adaptable low-power link-state policy for an interconnect link;
   monitoring traffic on the interconnect link to produce dynamic traffic data;
   receiving Quality of Service (QoS) requirements for,
   i. an application that at least one of transmits or receives data using the interconnect link; and
   ii. a device coupled to the interconnect link; and
   adjusting the adaptable low-power link-state entry policy for the interconnect link in response to the dynamic traffic data in combination with the application QoS requirements and the device QoS requirements.

2. The method of claim 1, further comprising:
   receiving operating system configuration information; and
   employing the operating system configuration information in implementing the adaptable low-power link-state policy for the interconnect link.

3. The method of claim 1, further comprising:
   receiving device latency tolerance requirements for a device coupled to the interconnect link; and
   employing the device latency tolerance requirements in implementing the adaptable low-power link-state policy for the interconnect link.

4. The method of claim 1, wherein the link comprises a PCI Express link.

5. The method of claim 1, wherein the interconnect link comprises one of a QuickPath Interconnect (QPI) link, an IOSF (Intel on-chip System Fabric) link or a Thunderbolt link.

6. The method of claim 1, wherein the adaptable low-power link-state policy is implemented by adapting an Active Status Power Management (ASPM) link timeout policy in response to the traffic data.

7. The method of claim 1, further comprising:
   determining a performance level of the adaptable low-power link-state policy; and
   adjusting parameters in logic for implementing the adaptable low-power link-state policy.

8. An apparatus comprising:
   an interconnect link, coupled between an upstream port and a downstream port;
   a traffic monitor, configured to generate traffic data when the apparatus is operating; and
   an adaptable low-power link-state policy block, configured to receive traffic data from the traffic monitor and receive Quality of Service (QoS) requirements for both an application and a device associated with the interconnect link to dynamically adjust a low-power link-state policy for the interconnect link in response to the traffic data and the QoS requirements.

9. The apparatus of claim 8, wherein the adaptable low-power link-state policy block is configured to receive configuration input from an operating system and employ the configuration information in implementing the low-power link-state policy for the interconnect link.

10. The apparatus of claim 8, wherein the adaptable low-power link-state policy block is configured to receive device latency tolerance requirements for a device associated with the interconnect link and to employ the device latency tolerance requirements in implementing the low-power link-state policy for the interconnect link.

11. The apparatus of claim 8, wherein the interconnect link comprises a PCI Express link.

12. A processor, comprising:
    a plurality of processor cores;
    a first interconnect interface, including a first port configured to send and receive communication traffic over a first interconnect link employing the first port at one end of the interconnect link; and
    a traffic monitor, configured to generate traffic data corresponding to traffic detected at the first port when the apparatus is operating,
    wherein the first port includes an adaptable low-power link-state policy block, configured to receive traffic data from the traffic monitor and to receive device Quality of Service (QoS) requirements from a device associated with the first interconnect link and application QoS requirements for at least one application and dynamically adjust a low-power link-state policy for the first interconnect link in response to the traffic data and the device and application QoS requirements.

13. The processor of claim 12, wherein the adaptable low-power link-state policy block is configured to receive configuration input from an operating system and employ the configuration information in implementing the low-power link-state policy for the first interconnect link.

14. The processor of claim 12, wherein the adaptable low-power link-state policy block is configured to receive device latency tolerance requirements for a device associated with the first interconnect link and to employ the device latency tolerance requirements in implementing the low-power link-state policy for the first interconnect link.

* * * * *